United States Patent [19]

La Force et al.

[11] 3,732,391
[45] May 8, 1973

[54] METHOD OF SOLID PHASE WELDING FOR PIPES

[76] Inventors: Jean La Force, P.O. Box C, Inverness, Calif. 94937; Carl Stringer, P.O. Box 755, Pearland, Tex. 77581

[22] Filed: June 1, 1971

[21] Appl. No.: 148,572

[52] U.S. Cl. .................. 219/67, 219/161, 228/44
[51] Int. Cl. ............................................ B23k 31/06
[58] Field of Search ............. 219/59, 60 A, 60 R, 219/66, 67, 161, 101, 104; 228/44; 29/497.5, 498, 482

[56] References Cited

UNITED STATES PATENTS

| | | | |
|---|---|---|---|
| 3,374,529 | 3/1968 | Osborn, Jr. et al. | 29/479.5 X |
| 3,633,813 | 12/1972 | Looney | 219/60 A |
| 3,164,712 | 1/1965 | Paton et al. | 219/161 X |
| 3,283,115 | 11/1966 | Nelson et al. | 219/60 R |
| 3,259,964 | 7/1966 | Engel | 219/60 R X |
| 2,777,048 | 1/1957 | Rocks | 219/161 |
| 3,461,264 | 8/1969 | Nelson et al. | 219/60 R |

Primary Examiner—J. V. Truhe
Assistant Examiner—L. A. Schutzman
Attorney—Harris Zimmerman

[57] ABSTRACT

Solid phase or pressure welding of adjacent pipe ends is accomplished by placing a pair of expandable elements maintained in axial alignment within the pipe ends and radially expanding the elements into firm grasping relationship with the interior bore walls of the respective pipe ends. Thereafter, the elements are axially moved together to place and hold the pipe ends in axially aligned abutment and create upset pressure in the region of the abutting ends while heat is applied thereto to produce a solid phase welded joint between the pipe ends.

2 Claims, 5 Drawing Figures

PATENTED MAY 8 1973 3,732,391
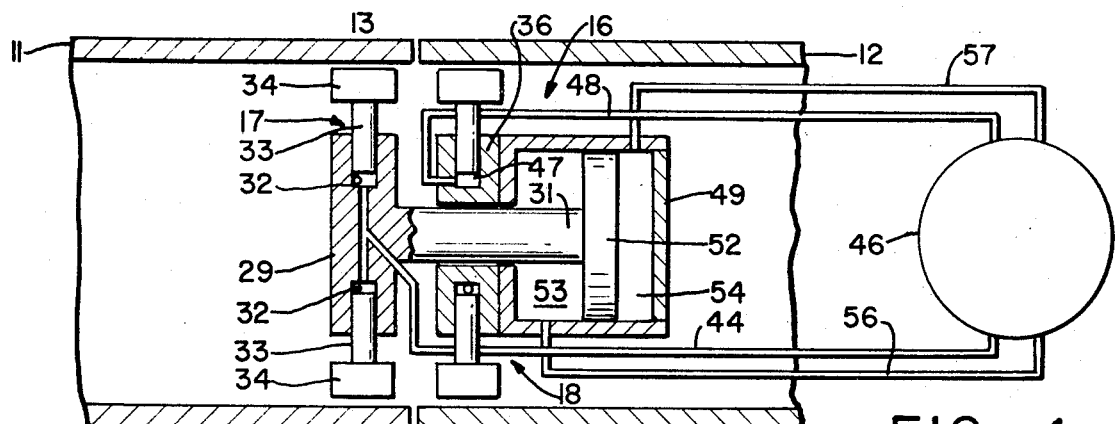
FIG_1
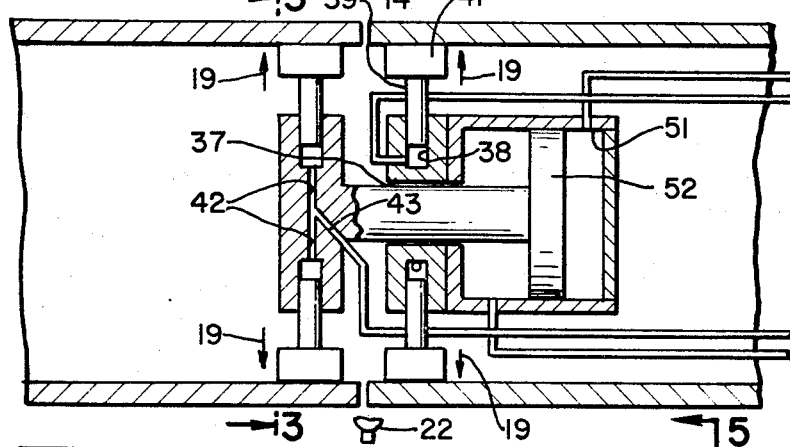
FIG_2
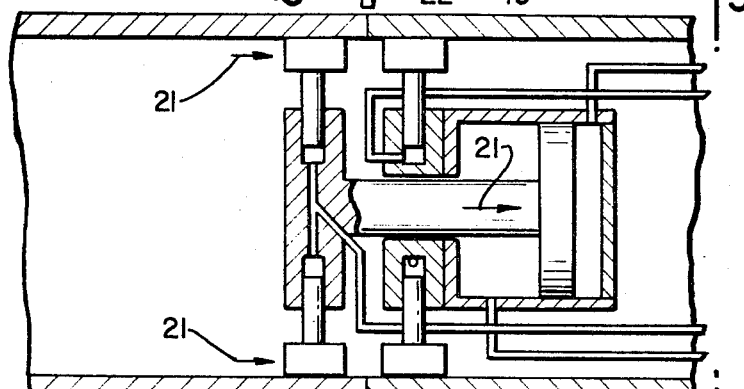
FIG_4
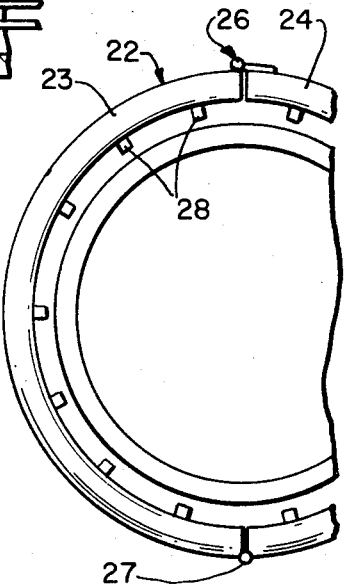
FIG_5
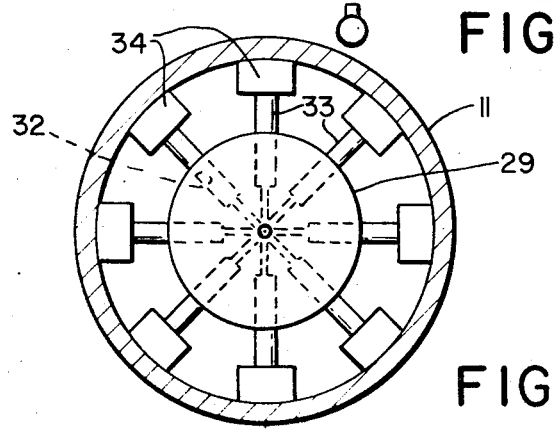
FIG_3
INVENTORS
CARL STRINGER
JEAN LA FORCE
BY
*Havis Zimmerman*
ATTORNEY

METHOD OF SOLID PHASE WELDING FOR PIPES

BACKGROUND OF THE INVENTION

Solid phase welding is sometimes referred to as "pressure welding" and is defined as a process for joining metal parts at subfusion temperatures by the application of heat and pressure.

Heretofore, there has been developed a method of joining pipe ends using the solid phase welding technique wherein a pair of pipe ends are brought into abutting relationship, external clamps are placed at spaced portions about each of the pipe ends, usually at some distance from the butt line, a burner ring or the like is placed completely around the circumferential plane of the joint for the purpose of applying heat to the ends, then through hydraulic jacks, or the like, the clamps are caused to be forced towards each other, thus applying pressure to the heated joint and producing a solid phase weld thereat. However, this system has not proved commercially successful for two reasons. First, the external clamping arrangement interferes with the positioning, etc., of the heater unit. Secondly, and possibly more important, it is the fact that the clamps must be placed at a substantial distance, e.g., 3 inches or more from the joint in order to permit positioning of the heater unit. With standard relatively thin wall pipe, for example, using the clamps at such distance will not produce axial alignment of the pipe ends and the pipe tends to deform such that an offset joint is produced.

SUMMARY OF THE INVENTION

The present invention relates to solid phase welding of pipes, and is more particularly directed to an improved method and apparatus for placing and holding adjacent pipe ends in axial aligned abutment and applying axial upset pressure to the abutting ends while heat is unobstructively applied thereto to produce a solid phase welded joint between the pipe ends.

It is an object of the present invention to provide for the placing and holding of pipe ends in axially aligned abutment and application of axial pressure to the abutting ends by placement of a pair of expander elements maintained in axial alignment within the pipes adjacent their abutting ends and radially expanding the elements into tight grasping relationship with the bore walls of the pipes followed by relative axial movement of the elements proximally to draw same together under pressure.

It is another object of the present invention to provide for the internal holding of pipe ends in axially aligned abutment under pressure in the manner hereinbefore described to facilitate unobstructed application of heat to the exterior of the pipes adjacent their abutting ends to produce a solid phase welded joint therebetween.

A further object of the invention is the provision of a solid phase welding system of the class described wherein axial pressure between the expander elements may be increased during heating of the joint to provide a proper amount of upset therein.

A still further object of the invention is to provide aligning and holding apparatus for internal disposition within adjacent pipes including a pair of axially aligned and translatable radially expandable elements, the radial expansion and axial translation of which are readily controllable exteriorly of the pipes.

BRIEF DESCRIPTION OF THE DRAWING

FIG. 1 is a sectional view taken at a diametric plane through two axially adjacent pipes containing internal aligning and holding apparatus preparatory to conduct of a solid phase welding method in accordance with the present invention;

FIG. 2 is a view similar to FIG. 1 depicting the apparatus in radially expanded position to place and hold the ends of the pipes in axial alignment during the initial stages of the method;

FIG. 3 is a sectional view taken on line 3—3 of FIG. 2;

FIG. 4 is a view similar to FIGS. 1 and 2 depicting the apparatus in axially translated position to hold the ends of the pipes in axially aligned abutment under pressure while heat is applied to the abutting ends during the final stages of the method; and FIG. 5 is a sectional view taken at line 5—5 of FIG. 4.

DETAILED DESCRIPTION OF THE INVENTION

Referring now to the drawing in detail, particularly FIG. 1, there are shown a pair of axially adjacent pipes 11 and 12, the adjacent ends 13 and 14 of which are to be joined together by solid phase welding. To accomplish such welding in accordance with the present invention, internal aligning and holding apparatus 16 including a pair of expandable elements 17 and 18 maintained in axial alignment are first coaxially placed within the pipes with the elements respectively adjacent the ends 13 and 14. The elements are radially expanded, as indicated by the arrows 19 in FIG. 2, into firm grasping engagement with the interior bore walls of the pipes. Since they are maintained in axial alignment, the elements 17 and 18, in engaging the bore walls of the pipes, place the pipes in axial alignment and hold the pipes in such relationship. As shown in FIG. 4, the elements 17 and 18 are then translated relative to each other axially together, as indicated by arrows 21. In the illustrated case this is accomplished by moving element 17 axially towards element 18. This causes the pipe ends 13 and 14 to be urged into axially aligned abutment, and the axial translating force exerted between the elements 17 and 18 is maintained to hold the abutting pipe ends together under a predetermined initial upset pressure.

Heat is uniformly peripherally applied to the exterior of the abutting pipe ends, as by means of a burner ring 22, or equivalent heater unit, placed completely about the joint therebetween. The ring 12 may, for example, be provided in two semi-circular sections 23 and 24, hinged together as indicated at 26, and securable together at a diametrically opposed point, as indicated at 27. The ring sections may thus be pivoted at the hinged connection 26 to an open position to facilitate circumferential placement about the joint, and thereafter secured together at 27 to form an integral ring. The ring 22 is preferably provided with a plurality of circumferentially spaced radially inwardly directed burner jets 28 to assure uniformity in its heating of the abutting pipe ends 13 and 14.

During the heating cycle, the pipe ends are heated sufficiently to initiate upset in the joint under the predetermined initial upset pressure. Upon the initiation of upset, the axial force between the elements 17 and 18 is increased to thereby increase the upset pressure at the joint. In this manner, the amount of upset is controlled to an exact predetermined value. When the desired upset is obtained, heating is terminated and axial force between the elements 17 and 18 is relaxed to terminate the application of upset pressure. Thereafter, the radial expanding forces of the elements 17 and 18 may be relaxed to permit withdrawal of the apparatus 16 axially through one of the pipes.

It will be appreciated that during the heating cycle, an inert gas, such as argon, is advantageously directed upon the interior of the joint at the abutting pipe ends in a manner well known in the art. The gas serves the dual purposes of preventing the formation of oxides and nitrides on the surface of the heat affected zone and speeding of cool down of the heated metal when the application of heat is terminated.

Considering now in more detail the internal aligning and holding apparatus 16 employed in the conduct of the solid phase pipe welding method described hereinbefore, the expander element 17 preferably includes a cylindrical body 29 having a shaft 31 coaxially projecting from one end face thereof. The body is formed with a plurality of circumferentially spaced bores 32 extending radially into the periphery thereof, which bores slidably receive the shanks 33 of a plurality of pressure shoes or pads 34 adapted to bear against the interior bore wall of one of the pipes 11 or 12 upon outward extension of the shanks. In other words, the pads are radially expandable into grasping engagement with the pipe bore wall.

The expander element 18 is generally similar to element 17 and includes a cylindrical body 36 having a central axial bore 37 slidably traversed by the shaft 31. The body 36 is thus coaxially disposed upon the shaft in rotatable and axially translatable relation therewith. It is important to note that the shaft serves to maintain the bodies 29 and 36 of expander elements 17 and 18 in coaxial alignment. Body 36 is formed with a plurality of circumferentially spaced bores 38 extending radially into the periphery thereof and slidably receiving the shanks 39 of a plurality of pressure pads 41. With the pads 34 of element 17 expanded into engagement with the bore wall of pipe 11 adjacent end 13, body 36 of element 18 may be axially translated to a position within pipe 12 adjacent end 14 and the pads 41 of element 18 expanded into engagement with the bore wall of the pipe thereat. The body 29 may be then axially translated towards body 36 to thus draw the pipe ends 13 and 14 together into axially aligned abutment and the bodies held together to establish the previously noted pressure between the pipe ends.

Although the radial expansion of the pads 34 and 41 of the respective elements 17 and 18 and axial translation of the bodies 29 and 36 thereof may be variously effected, such as by mechanical or pneumatic means, it is preferred that hydraulic actuating means be employed for this purpose. In this regard, a plurality of passages 42 extend from the bases of bores 32 into communication with a common passage 43, in turn communicably connected by means of a conduit 44 to a hydraulic source and control unit 46. A plurality of passages 47 commonly interconnect the bases of bores 38 and are communicated with a conduit 48 connected to the unit 46. A hollow casing 49 interiorly defining a closed cylinder bore 51 is coaxially secured to the distal face of body 36 relative to body 29, and shaft 31 slidably extends through an end of the casing coaxially into the bore 51. The free end of the shaft is formed with a piston 52 in slidable engagement with the wall of bore 51 to define therewith chambers 53 and 54 respectively on opposite sides of the piston. These chambers 53 and 54 are respectively communicably connected by means of conduits 56 and 57 to the hydraulic source and control unit 46. The conduits 44, 48, 56 and 57 may be, for example, led through a guide pipe (not shown) secured to casing 49 and extending exteriorly of pipe 12 whereat the conduits are connected to the unit 46. In this manner, the functions of the apparatus 16 are readily controllable exteriorly of the pipes. Furthermore, the guide pipe facilitates initial positioning of the overall apparatus at the adjacent pipe ends.

As regards the operation of the apparatus 16 with same initially positioned at the adjacent pipe ends 13 and 14, pressurized hydraulic fluid is delivered from source and control unit 46 via conduit 44 to the base ends of bores 32 to thereby urge the shanks 33 radially outward and engage pads 34 in firm grasping relationship with the bore wall of pipe 11. Hydraulic pressure is maintained to hold the pads in such engagement with the bore wall of the pipe. Fluid flow is then controlled to and from the chambers 53 and 54 via conduits 56 and 57 to effect relative axial translation between the piston 52 and wall of bore 51 in an appropriate direction to axially move expander element 18 into proper position within the end of pipe 12. Fluid is now delivered via conduct 48 to the base ends of bores 38 to urge shanks 39 radially outward and engage pads 41 in firm grasping relationship with the bore wall of pipe 12, and the hydraulic pressure is maintained to hold the pads in position. Hydraulic fluid is thereafter delivered to chamber 53 via conduit 56 and fluid is returned to unit 46 from chamber 54 via conduit 57. As a result, piston 52 is translated axially towards the right (as viewed in the drawing) to thereby translate pipe end 13 into abutment with pipe end 14. The fluid in chamber 53 is maintained at a predetermined pressure such that the pipe ends are held in abutment with a predetermined pressure. The pressure between the abutting pipe ends may be increased as desired by increasing the hydraulic pressure within chamber 53 acting upon piston 52. Subsequent to completion of the welding method hereinbefore described, the pressure in chamber 53 may be relaxed to release the pressure acting between the pipe ends. The hydraulic pressures acting at the base ends of bores 32 and 38 may be relaxed to disengage pads 34 and 41 from the bore walls of pipes 11 and 12 to thereby free the apparatus 16 for withdrawal through the pipe 12 by means of the guide pipe, or other suitable facility.

We claim:

1. A method of solid phase welding adjacent ends of axially aligned pipes, comprising: respectively grasping the pipes only interiorly of said pipes closely adjacent and spaced from said ends with a pair of grasping elements using radial outward pressure substantially uniformly along the circumference of said pipes to cause said pipe ends to assume a circular configuration; maintaining coaxial alignment of the grasping elements to place and hold the pipe ends in axially aligned relationship; thereafter urging said grasped pipe ends into abutting relationship under pressure by urging the elements axially toward each other while maintaining said axial alignment and maintaining substantially the same radial outward grasping pressure; uniformly applying an exterior source of heat simultaneously around the entire periphery of the abutting pipe ends while said radial outward and axial pressures are maintained to heat the abutting pipe ends to an elevated temperature substantially below their fusion temperature; increasing the axial urging of the pipe ends into abutting relationship without increasing the radial outward grasping pressure after the pipe ends have assumed the subfusion welding temperature during heating and before the heat applying step is terminated to solid phase weld the pipe ends together under axial pressure and subfusion temperature only; and maintaining the external surfaces of said pipes adjacent their abutting ends free of clamping pressures during the steps of applying heat and increasing the axial urging.

2. The method of claim 1, including the steps of subsequently terminating the axial urging and heat applying until the welded ends have cooled substantially, and thereafter separately terminating the interior grasping.

* * * * *